United States Patent [19]

Hashimoto

[11] Patent Number: 5,018,014
[45] Date of Patent: May 21, 1991

[54] TV RECEIVER AND METHOD FOR CONCURRENTLY DISPLAYING A REPRODUCED STORED PROGRAM AND A RECEIVED PROGRAM

[75] Inventor: Kazuo Hashimoto, Tokyo, Japan
[73] Assignee: Hashimoto Corporation, Tokyo, Japan
[21] Appl. No.: 396,570
[22] Filed: Aug. 21, 1989
[30] Foreign Application Priority Data Aug. 24, 1988 [JP] Japan .................. 63-210071

[51] Int. Cl.⁵ ............................................. H04N 5/272
[52] U.S. Cl. ......................................... 358/183; 358/22
[58] Field of Search .................. 358/183, 22, 311, 181
[56] References Cited

U.S. PATENT DOCUMENTS 4,612,569 9/1986 Ichinose ................................ 358/22
4,777,531 10/1988 Hakamada .......................... 358/22

FOREIGN PATENT DOCUMENTS 0212389 8/1986 European Pat. Off. .
1357685 4/1972 United Kingdom .

Primary Examiner—Tommy P. Chin
Attorney, Agent, or Firm—Lowe, Price, LeBlanc, Becker & Shur

[57] ABSTRACT

When a user wants to reproduce a necessary scene once more again during the TV reviewing, a main picture is continuously displayed on a TV screen while a side picture and sound which are recorded without using a conventional endless tape. The size of the audio picture on the TV screen is adjustable. In comparison with prior art using the conventional tape or the like, it is not necessary to worry about mechanical wear and installation.

6 Claims, 1 Drawing Sheet

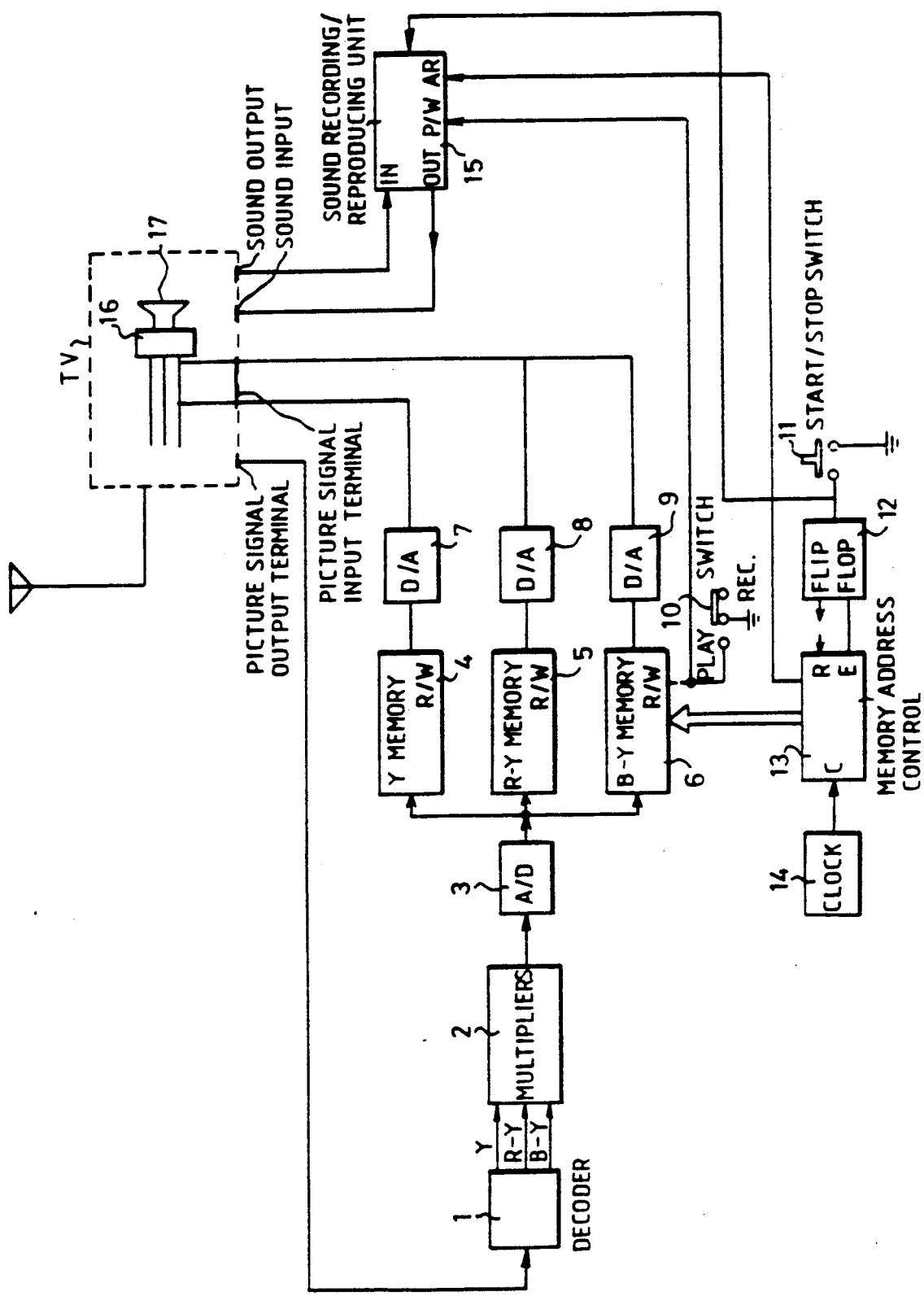

TV RECEIVER AND METHOD FOR CONCURRENTLY DISPLAYING A REPRODUCED STORED PROGRAM AND A RECEIVED PROGRAM

BACKGROUND OF THE INVENTION

The present invention relates to a TV receiving device and method.

According to a conventional TV set, the viewer cannot watch a spot scene in detail and repeatedly while he is watching TV even if he has a desire to do so. This desire is partially satisfied by Japanese Patent Application No. S62-207775 belonging to the same applicant, wherein a video cassette tape recorder (VCR) is required.

If the viewer wants to watch once more or confirm a TV scene during the TV reviewing, there has been no means but using the well-known endless VCR to play back that scene at another time. This is seriously inconvenient for the viewer and it costs a great deal, so that there are a number of problems which cannot be accepted by the general viewer.

SUMMARY OF THE INVENTION

It is an object of the present invention to provide a TV receiving device and method having repeating function wherein if a viewer wants to watch once more or confirm a scene of the TV program which the viewer is now watching, the recording and reproducing operations of an IC which is operative simultaneously with the TV viewing are infinitely repeated for predetermined seconds and it is possible to reproduce a spot picture and sound at an instant which are recorded in the IC in a partial portion of a TV screen without interrupting a main picture and sound of the TV program when the viewer operates one button if he wants to watch again the spot picture.

The above and other objects, features and advantages of the present invention will become more apparent from the following description when taken in conjunction with the accompanying drawing in which a preferred embodiment of the present invention is shown by way of illustrative example.

BRIEF DESCRIPTION OF THE DRAWING

The single FIGURE is a diagram showing the principle of the present invention.

DESCRIPTION OF THE PREFERRED EMBODIMENT

The present invention will be described in the following in connection with its whole structure.

In the FIGURE, reference numeral 1 designates a decoder for extracting a brightness signal Y and color signals R-Y and B-Y from a picture signal coming from the picture signal output terminal of a TV receiver; numeral 2 designates a multiplexer for extracting the brightness signal Y and the color signals R-Y and B-Y alternately; numeral 3 designates an A/D converter for converting analog signals to digital signals; numerals 4, 5 and 6 designate memories for the brightness signal Y and the color signals R-Y and B-Y; numerals 7, 8 and 9 designate D/A converters for converting digital signals to analog signals; numeral 10 designates a changeover switch for switching the aforementioned three memories between the recording and playing modes; numeral 11 designates a start/stop switch for starting or stopping the recording and playing modes; numeral 12 designates a binary flip-flop to be set and reset by the output of the switch 11; and numeral 13 designates a memory address control unit which is composed of a counter or the like for switching the addresses and frames of the aforementioned three memories. The memory address control unit 13 resets the reset signal R of the counter, when it reaches the maximum memory addresses and detects an output from an overflow terminal OV, to return the counter output to 0 thereby to start the counter output from 0 so that the aforementioned memories can be endlessly used. Moreover, reference numeral 14 designates a sampling clock.

Next, the operations will be described in the following.

When a user wants to review again a scene of a TV program at an instant or a scene of several tens of seconds before, the start/stop switch 11 is depressed one time from the first. Then, the binary flip-flop 12 is set to activate the memory address control unit 13 with its output. Here, the switch 10 is switched to an REC side for the recording operation.

At this time, the counter memory address control unit 13 starts its counting operation from 0 by using, the pulses coming from the clock 14 as its sampling frequency. This counted number designates the addresses of the aforementioned three memories 4, 5 and 6. The TV program transmits thirty frames per second. For this recording of thirty seconds, for example, memories of high capacity are necessary. If, on the other hand, the picture of a memory is to be displayed in a portion of the CRT, as described later, the picture signal can be cut and sampled more easily so that the lower capacity of the memories can be sufficient.

Now, if the recording operations are continued, as described above, so that the memory address control unit designed to match the maximum capacity of the aforementioned memories is going to exceed the maximum counted number, the output comes out from the overflow terminal OV to reset the inside counters to drop the counted number to 0. Even if the counted number takes the value 0, the pulses continuously come in from the clock 14 so that the counter operations continue. As a result, the aforementioned three memories 4, 5 and 6 endlessly function.

If the switch 10 is switched to the reproduction PLAY side at a suitable timing, the three memories 4, 5 and 6 are switched from the writing state to the reading state for the reproducing operation. The picture is displayed, if it is cut to one third and sampled, in a ⅓ reduced picture simultaneously with the picture being received. The displayed position can be located in an arbitrary corner of the screen display, for example, by means of a remote control box of a digital TV receiver of a certain maker. This TV structure may be used.

In order to display the reproduced picture in the greatest portion of the CRT, on the other hand, high-speed memories are required with the sampling frequency of about 14 MHz. This can be realized because the memories per se are improved at present to have higher capacities and speeds by individual makers.

In the present invention, on the other hand, sound can be recorded and reproduced together with the picture simultaneously with the depression of the aforementioned start/stop switch by a sound recording/reproducing unit 15 using memories (although not shown). The recording time is equal to that of the aforementioned one of the pictures, and the endless operations are executed by a structure similar to that used for the reproduced picture.

The picture and sound recording operations thus far described can be endlessly accomplished for thirty seconds, for example. But this time can be shortened from the thirty second to an arbitrary period for the endless recording operations. For this, although not shown, there is prepared a preset counter (which will be referred to as a "second counter") having the same maximum counted number as that of the foregoing counter. While the not-shown switch (which will be referred to as a "second switch") is being depressed, the picture recording is continued by the Y memory 4, the R-Y memory 5 and the B-Y memory 6. During this recording operation, the counting operations of the counter in the memory address control unit 13 proceed, as described hereinbefore, and the counted value of this counter is preset and stored in the second counter. In other words, the maximum counted number at this time is stored. If the picture recording operation is to be ended for three seconds, at example, the operation is automatically switched to the reproducing operation by releasing the depression of the second switch. This reproduction is started from the counted number 0 of the counter in the memory control unit 13. If the reproduction reaches the aforementioned three seconds so that coincidence between the counted number of the counter of the memory address control unit 13 and the maximum counted number stored in the second counter is detected by a comparator (although not shown), the same picture is repeatedly reproduced after the counter of the memory address control unit 13 is returned to the counted number 0. That is to say, the picture image is endlessly reproduced for three seconds. Another structure can be made so that the start/stop switch 11 is depressed to stop the repeating operations.

The same means is used for the sound.

If a portion of the picture, i.e., the portion of three seconds is to be endlessly reviewed during the endless reproduction of the picture of thirty seconds, the endless picture of three seconds can be reviewed in a portion of the main picture being projected, in place of the aforementioned endless picture of thirty seconds so that a convenient method can be provided for confirming the instant operation.

If, moreover, the aforementioned endless reproduction is ended to switch the switch 10 to the REC side, the memories 4, 5 and 6 are brought into their writable states so that their outputs to the D/A converters 7, 8 and 9 disappear. As a result, the reduced picture displayed in the corner of the CRT disappears to leave only the first picture broadcast and displayed.

The aforementioned operations will be described in detail in the following. In the operation described above the recording/reproducing operations could be endlessly accomplished for the maximum time of thirty seconds, for example, and the memories are partially used to accomplish the endless recording/reproducing operations for three seconds. The remaining twenty seven seconds could not be efficient for making effective use of the memories.

As a means for solving this problem, the picture can be recorded fully in the memories of thirty seconds, and the range of the portion which the user wants to watch can be designated so that it may be endlessly reviewed, as will be described in the following. For this, the switch (although not shown) is continuously depressed while the picture to be reviewed is displayed. The (start) addresses of the memories 4, 5 and 6 at the start of the depression of the switch are stored in the memory address control unit 13, and the (end) addresses of the memories 4, 5 and 6 at the release of the switch depression are likewise stored in the memory address control unit 13 so that the picture to be reviewed between the start addresses and the end addresses can be endlessly reproduced.

Incidentally, the time interval after the picture to be reviewed is displayed before the aforementioned switch is depressed may possibly be delayed. The aforementioned start addresses can be subtracted by two or three seconds in the memory address control unit 13 so that the picture two or three seconds before the start of the switch depression can be reproduced.

If the user wants to watch the endless picture of a subsequent instant scene after the instant endless observation of the desired picture, the aforementioned switch is depressed at the end of the preceding picture to designate the range of the subsequent endless reproduction. Thus, the subsequent picture can be endlessly reviewed. In any event, if only the main picture is to be returned to the broadcasted picture after the reviewing of the endless picture, the switch 10 is switched to the REC side, as has been described hereinbefore, so that the endless picture disappears to leave only the first picture.

As has been described hereinbefore, according to the present invention, the recording and reproducing operations of a predetermined short time, i.e., several to several tens of seconds are infinitely accomplished in the IC circuit which is separately built in the TV receiver, during the reviewing of the TV program. If the user wants to repeatedly watch or confirm that portion during the TV reviewing, its picture and sound can be reproduced in a portion of the TV screen by operating one switch. In this manner, the main picture can be reproduced partially or mostly in the TV screen without any interruption. Thus, the present invention can improve the practical value remarkably of the TV receiver.

Although a certain preferred embodiment has been shown and described, it should be understood that many changes and modifications may be made therein without departing from the scope of the invention.

I claim:

1. A TV receiving device having repeating function, comprising:
   means for continuously repeating a short-time video and audio recording operation to an IC having a predetermined storage capacity for a period of t1 seconds while a viewer is watching a main TV picture;
   user operable switch means for making a circuit operative for repeatedly reproducing recorded video and sound which have been stored as signals in said IC if the viewer wants to watch in detail an instant spot during the viewing of the main picture;
   means for continuously reproducing said recorded video on at least a portion of a TV screen;
   means for continuing the displaying of the main picture on said TV screen without any interruption even during the reproduction of said recorded video; and
   means for termination of said reproduction of said recorded video and sound whereby only said main TV picture is thereafter displayed on said TV screen.

2. A TV receiving device according to claim 1, wherein said viewed main picture and sound are currently received transmissions.

3. A TV receiving device according to claim 1, wherein said viewed main picture and sound are reproduced from a video cassette tape recorder.

4. A TV receiving device according to claim 1, wherein said viewed main picture and sound are the continuously repeating recorded video and audio.

5. A TV receiving device according to claim 1, wherein said means for continuously reproducing comprises means for manually or remotely varying the location and percentage of the screen occupied by said recorded video that is reproduced.

6. A TV receiving method having repeating function, comprising: continuously recording for a short-time video and audio signals to an IC having a predetermined storage capacity while a viewer is watching a TV image;

continuously reproducing a picture and sound corresponding to the video and audio signals recorded into said IC for said short time;

continuously displaying the produced picture on a portion of a TV screen while concurrently displaying a separate TV image on the remainder of said screen; and eliminating one of the sounds associated with the recorded audio or said separate TV image when said reproduced picture and said separate TV image are concurrently displayed on said screen.

* * * * *